United States Patent
Bai et al.

(10) Patent No.: US 9,254,455 B2
(45) Date of Patent: Feb. 9, 2016

(54) METHOD FOR FILTERING

(71) Applicant: Industrial Technology Research Institute, Hsinchu (TW)

(72) Inventors: Ming-Der Bai, Changhua County (TW); Te-Chang Lan, Taipei County (TW); Kuo-Ti Chen, Hsinchu County (TW); Hom-Ti Lee, Hsinchu (TW); Yun-Huin Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 30 days.

(21) Appl. No.: 14/454,637

(22) Filed: Aug. 7, 2014

(65) Prior Publication Data

US 2014/0346127 A1 Nov. 27, 2014

Related U.S. Application Data

(62) Division of application No. 12/748,346, filed on Mar. 26, 2010, now abandoned.

(30) Foreign Application Priority Data

Dec. 15, 2009 (TW) .............................. 98142841 A

(51) Int. Cl.
| | |
|---|---|
| *B01D 63/00* | (2006.01) |
| *C02F 1/44* | (2006.01) |
| *B01D 29/00* | (2006.01) |
| *B01D 29/46* | (2006.01) |
| *B01D 29/70* | (2006.01) |

(Continued)

(52) U.S. Cl.
CPC .............. *B01D 29/705* (2013.01); *B01D 29/56* (2013.01); *B01D 39/1623* (2013.01); *B01D 39/2082* (2013.01); *C02F 1/001* (2013.01); *B01D 2239/065* (2013.01); *B01D 2239/1216* (2013.01)

(58) Field of Classification Search
CPC ............. B01D 2325/022; B01D 39/08; B01D 39/1623; B01D 63/061; B01D 71/68; B01D 69/10; B01D 2325/40; B01D 53/228; B01D 71/08; B01D 71/06
USPC .................................................. 210/484, 650
See application file for complete search history.

(56) References Cited

U.S. PATENT DOCUMENTS

| 3,651,947 A | 3/1972 | Schollhamer |
| 3,891,556 A | 6/1975 | Richardson et al. |

(Continued)

FOREIGN PATENT DOCUMENTS

| CN | 1124505 A | 6/1996 |
| CN | 2242120 Y | 12/1996 |

(Continued)

OTHER PUBLICATIONS

"AlgaeVenture Systems Harvester," Univenture, Inc., downloaded from www.algaeventuresystems.com, May, 2009.

(Continued)

*Primary Examiner* — Ana Fortuna

(57) ABSTRACT

Embodiments of the disclosure provide a filter structure. A second porous film having a plurality of second holes is disposed on a first porous film having a plurality of first holes. The second holes are smaller than the first holes. The filter structure is dried by an easy and power-saving method such as compression.

8 Claims, 3 Drawing Sheets

(51) Int. Cl.
*B01D 39/16* (2006.01)
*B01D 39/20* (2006.01)
*B01D 29/56* (2006.01)
*C02F 1/00* (2006.01)

(56) References Cited

U.S. PATENT DOCUMENTS

| | | | |
|---|---|---|---|
| 4,192,838 | A | 3/1980 | Keith et al. |
| 4,627,850 | A | 12/1986 | Deters et al. |
| 4,787,949 | A | 11/1988 | Coke et al. |
| 4,929,353 | A | 5/1990 | Harris |
| 5,472,607 | A | 12/1995 | Mailvaganam et al. |
| 5,552,053 | A | 9/1996 | Ho et al. |
| 5,776,567 | A | 7/1998 | Schilling et al. |
| 6,354,444 | B1 | 3/2002 | Mahendran et al. |
| 6,464,741 | B2 * | 10/2002 | Yancey ............... B24B 37/04 106/3 |
| 6,603,054 | B2 | 8/2003 | Chen et al. |
| 6,773,692 | B2 | 8/2004 | Pecharsky et al. |
| 7,988,860 | B2 | 8/2011 | Kalayci et al. |
| 8,038,885 | B2 | 10/2011 | Schmidt et al. |
| 8,092,691 | B2 | 1/2012 | Youngs et al. |
| 8,231,013 | B2 | 7/2012 | Chu et al. |
| 8,263,214 | B2 | 9/2012 | Kalayci et al. |
| 8,286,801 | B2 | 10/2012 | Youngs et al. |
| 2001/0024716 | A1 | 9/2001 | Chen et al. |
| 2005/0051479 | A1 | 3/2005 | Mahendran et al. |
| 2006/0180544 | A1 | 8/2006 | Kools |
| 2006/0289350 | A1 | 12/2006 | Ji |
| 2008/0149561 | A1 | 6/2008 | Chu et al. |
| 2009/0011294 | A1 | 1/2009 | Kong |
| 2009/0065436 | A1 | 3/2009 | Kalayci et al. |
| 2010/0224574 | A1 | 9/2010 | Youngs et al. |
| 2011/0000436 | A1 * | 1/2011 | Jang ..................... A01K 63/045 119/253 |
| 2011/0139731 | A1 | 6/2011 | Bai et al. |
| 2012/0103893 | A1 | 5/2012 | Youngs et al. |
| 2012/0132575 | A1 * | 5/2012 | Kuennen ................ C02F 3/06 210/151 |
| 2015/0273985 | A1 * | 10/2015 | Luley ................. B01D 46/0023 96/134 |

FOREIGN PATENT DOCUMENTS

| | | |
|---|---|---|
| CN | 1284007 | 2/2001 |
| CN | 1565958 | 1/2005 |
| CN | 1681150 A | 10/2005 |
| CN | 1901261 A | 1/2007 |
| CN | 201253507 Y | 6/2009 |
| JP | 2001-275654 | 10/2001 |
| TW | 204518 | 4/1993 |
| TW | 532388 | 5/2003 |
| TW | I296538 | 8/2006 |
| TW | 200819190 A | 5/2008 |

OTHER PUBLICATIONS

Ross O. Youngs, "Harvesting, Dewatering, and Drying Technology," Univenture Inc., Mar. 15, 2009.
China Patent Office, Office Action, Patent Application Serial No. 200910130262.9, Aug. 1, 2012, China.
Taiwan Patent Office, Office Action, Patent Application Serial No. 098142841, Jul. 24, 2012, Taiwan.
China Patent Office, Office Action, Patent Application Serial No. 201010003936.1, Jul. 11, 2012, China.

* cited by examiner ns, wherein:

METHOD FOR FILTERING

CROSS REFERENCE TO RELATED APPLICATIONS

This application is a Divisional of application Ser. No. 12/748,346, filed on Mar. 26, 2010, which claims priority of Taiwan Patent Application No. 098142841, filed on Dec. 15, 2009, the entirety of which is incorporated by reference herein.

TECHNICAL FIELD

The technical field relates to filtering method.

BACKGROUND

A filtration method is a common way to separate solids and liquids. A filter having smaller holes is used to intercept larger solids. The smaller solid and liquid particles pass through the holes. Separating solids and the liquids is thus achieved. However, the conventional filtration method faces a problem where the small holes of the filter are easily blocked by the separated solids in the filtrated solution. Thus the operating lifespan of the filter is very short. Additionally, the small blocked holes need to be washed in order to refresh their ability to function. This requires additional equipment and process and it increases the operating costs. In addition, to increase filtering speed, a high speed-rotating pump is used to produce a compressing or vacuuming process. However, operating the pumping consumes more energy and increases operating costs.

SUMMARY

One embodiment of the disclosure provides a method for filtrating, comprising: providing a filter structure; drifting down a mixed solution onto a top surface of the second porous film of the filter structure to intercept residue larger than the second holes in the mixed solution, and a liquid in the mixed solution passing through the second holes and allow the liquid to continue to flow downward; wherein the filter structure for filtering a liquid containing solid particles having a diameter between 0.5 μm to 10 μm, comprising: a first porous film having a plurality of first holes; a second porous film on the first porous film and having a plurality of second holes, wherein the second holes are smaller than the first holes; and a film capable of absorbing water disposed between the first porous film and the second porous film, wherein the diameters of the second holes are smaller than the diameters of solid particles in the liquid; wherein the range of the diameter of the first holes is between diameters of the second holes and 0.457 cm, after the first porous film and the film capable of absorbing water absorbs the liquid, compressing the first porous film and the film capable of absorbing water by a compressing force to drain out the liquid and rinse the second porous film when the liquid flows back to the second porous film due to the compression to remove the residue blocking the second holes; and removing the compressing force so that the compressed first porous film and the compressed film capable of absorbing water springs back to an original shape.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
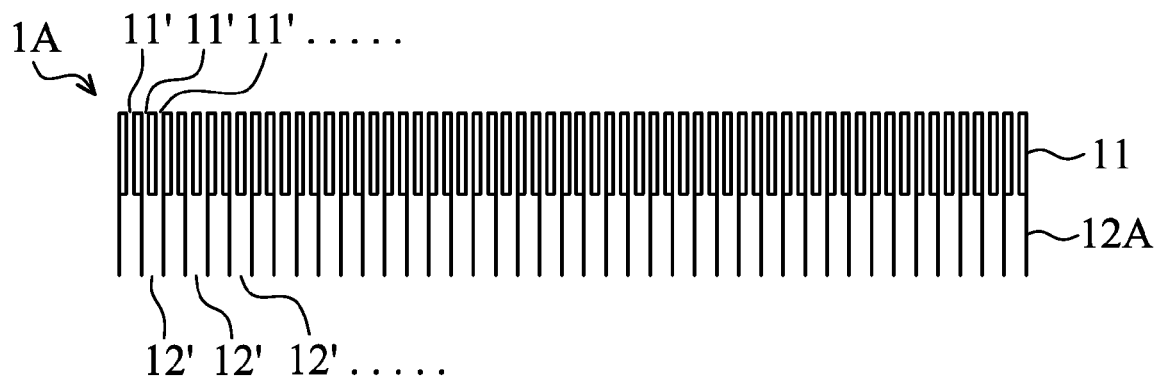
FIGS. 1-3 are cross-section views of filter structures according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments provide a filter structure for separating solids and liquids. The filter structure has excellent venting efficiency, and avoids the problem of getting blocked holes as a result of filtrated residue. Moreover, the filter structure can be dried by an easy and cost-saving compressing method. References will be made in detail to the present embodiments, and examples of which are illustrated in the accompanying drawings. Wherever possible, the same reference numbers are used in the drawings and the descriptions to refer to the same or like parts. In the drawings, the shape and thickness of one embodiment may be exaggerated for clarity and convenience. The descriptions will be directed in particular to elements forming a part of, or cooperating more directly with, an apparatus in accordance with an embodiment. It is to be understood that elements not specifically shown or described may take various forms well known to those skilled in the art.

Figure 2:
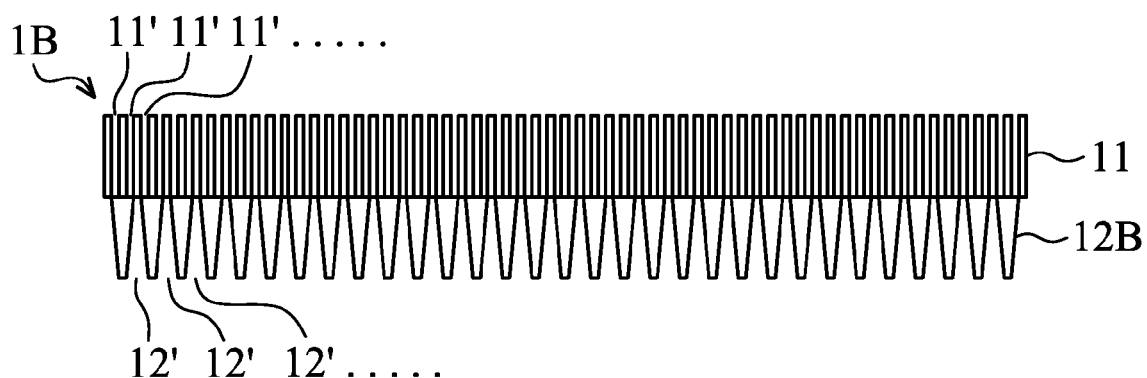
Figure 3:
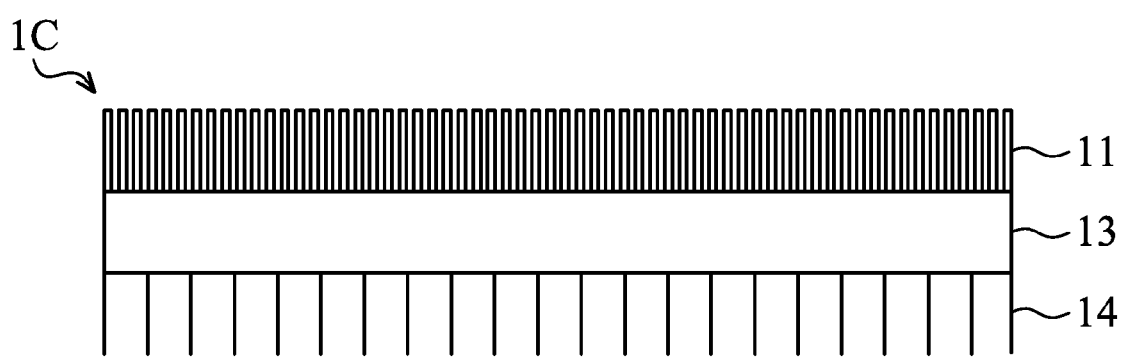

FIGS. 1-3 are cross-section views of structures of embodiments.

Referring to FIGS. 1-2, the filter structure 1A, 1B, for separating the solids and liquids, comprises a porous filter film 11 and porous films capable of absorbing water 12A, 12B. Holes in the porous filter film 11 are smaller than holes in the porous films capable of absorbing water 12A, 12B. It should be understood that in the description, the film capable of absorbing "water" also means a material capable of absorbing "any kind of liquid" without being limited to absorbing "water", and it is not repeatedly described thereafter for conciseness. The difference between the structures of FIG. 1 and FIG. 2 is that the holes of the porous film capable of absorbing water 12A of FIG. 1 are substantially the same size, and the holes of the porous film capable of absorbing water 12B of FIG. 2 gradually become larger from the top to the bottom of the porous film capable of absorbing water 12B. The porous film capable of absorbing water 12B having holes that gradually becoming larger from the top to the bottom may be formed by stacking a plurality of porous films capable of absorbing water with different-sized holes. The hole size of the porous filter film 11 may be smaller than the solid to be filtrated. For example, the diameter of the hole may be smaller than 0.5 μm for an activated sludge, 10 μm for an activated sludge treated by a coagulation process, and 1 μm for microalgae. The diameters of the holes of the porous film capable of absorbing water 12A, 12B range between diameters of the holes of the porous filter film 11 and 0.457 cm. The porous filter film 11 may comprise a polyvinyl alcohol (PVA), polyethersulfone, cellulose triacetate, polypropylene fiber, polyvinyl chloride, or other suitable materials such as a porous cellulose (for example, regenerated cellulose) or ceramics.

The porous films capable of absorbing water 12A, 12B may comprise a polymer such as polyvinyl alcohol (PVA), polyurethane, polyacrylic acid, polyacrylamide, polyethylene or polystyrene, or other suitable foam materials, or may comprise other suitable materials capable of absorbing water, such as non-woven fiber or (synthetic) fiber.

The filter structure 1C shown in FIG. 3 has the porous filter film 11 which is capable of absorbing water 13 and porous supporting film 14. The holes in the porous filter film 11 are smaller than the holes in the porous supporting film 14. The holes in the porous supporting film 14 shown in FIG. 3 are essentially the same size. However, they can also gradually become larger from the top to the bottom of the porous supporting film 14 (not shown). For example, the porous supporting film 14 having holes which gradually become larger from the top to the bottom may be formed by stacking a plurality of porous films capable of absorbing water of different-sized holes. The hole size of the porous filter film 11 may be smaller than the solids to be filtrated. For example, the hole diameter may be smaller than 0.5 µm for an activated sludge, 10 µm for an activated sludge treated by a coagulation process, and 1 µm for a microalgae. The diameters of the holes of the porous supporting film 14 range between the diameters of the holes of the porous filter film 11 and 0.457 cm. The porous filter film 11 may comprise a polymer such as polyvinyl alcohol (PVA), polyethersulfone, cellulose triacetate, polypropylene fiber, polyvinyl chloride, or other suitable materials such as a porous cellulose (for example, regenerated cellulose) or ceramics. The film capable of absorbing water 13 may comprise a polymer such as polyvinyl alcohol (PVA), polyurethane, polyacrylic acid, polyacrylamide, polyethylene or polystyrene, or other suitable foam materials, or may comprise other suitable materials capable of absorbing water, such as non-woven fiber or (synthetic) fiber. The supporting film 14 may comprise the material used for the film capable of absorbing water 13, or other suitable materials having the sufficient physical strength and the holes, such as a metal.

It should be noted that the holes shown in FIGS. 1-3 are the through holes passing through the film, but they also can be voids disorderly distributed in the film (not shown).

The filter structure of the embodiments is a multi-layered structure. The holes of the upper filter film (such as the porous filter film 11 shown in FIGS. 1-3) are smaller than the lower film capable of absorbing water (such as the film capable of absorbing water 12A, 12B shown in FIGS. 1-2) or supporting film (such as the supporting film 14 shown in FIGS. 1-3). Therefore, when removing water by compression, a great amount of the liquid flows down, and only a small amount of the liquid flows up and back. To ensure that the liquid flows down smoothly when filtrating, the capillary attraction force difference between the upper and lower films and the water absorption force of the material capable of absorbing water (such as the porous films capable of absorbing water 12A and 12B of FIGS. 1-2 and the supporting film 14 of FIG. 3) can not exceed the gravity force of the filtrated solution itself.

The following description assumes that r represents the diameter of the hole of the upper film (or filter film), and R represents the diameter of the hole of the lower film (or film capable of absorbing water or supporting film) of the filter structure, and $\gamma$ represents the surface tension, $\theta$ represents the contact angle, $\rho$ represents the liquid density, and g represents acceleration of gravity.

In the situation where a filter structure of a single filter film having holes of radius r is used, and during the filtration process, there is still water not filtrated on the surface and only the bottom of the holes is contacted with air, the surface tension force is $2\pi r \gamma \cos \theta$, which is an upward drag force. The downward driving force for the filtration process is the gravity force generated by the water in the filter film and the mixed solution not yet filtrated still on the surface of the filter film (the total height of both which is assumed as $h_1$). In order to make the liquid smoothly flow down, the gravity force of the liquid ($\pi r^2 \rho g h_1$) must be bigger than the surface tension force $2\pi r \gamma \cos \theta$, in other words, the condition of $h_1 > (2\gamma \cos \theta)/(\rho g r)$ must be conformed. Accordingly, as the diameter (r) increases, the liquid height needed for driving the filtration process decreases. However, the diameter of the hole in fact can not be enlarged infinitely since it is decided depending on the size of the impurities to be filtrated.

In exemplary embodiments, the film capable of absorbing water or supporting film (lower film) having the smaller holes is disposed under the filter film (upper film) having the larger holes. The surface tension force associated with the holes of the film capable of absorbing water or supporting film (lower film) is $2\pi r \gamma \cos \theta$. Since the diameters of the holes of the lower film are bigger than that of the upper film (R>r), the height ($h_2 > (2\gamma \cos \theta)/(\rho g R)$) of water to provide a sufficient gravity force to flow downward is small In addition, the effective height of water in the lower film is the total height of the described height $h_1$ and the thickness of the lower film. Therefore, the driving force for filtrating of the multi-layer filter structure of the embodiments is better than the conventional single-layer filter structure.

Moreover, the material having good hydrophility, such as the above-mentioned PVA, can be used for the filter structure of the embodiments to increase the attraction force for absorbing water (or any liquid, which will not be repeatedly described here), so as to further increase the driving force for the filtration process. The water in the filter film (upper film) should contact with the film capable of absorbing water (lower film) so that the film capable of absorbing water (lower film) can attract the water by the capillary force. However, if the holes of the lower film are too big to receive the water flowing from the filter structure, the water would directly drop down through the holes of the film capable of absorbing water and not contact with the film. Therefore, such a film capable of absorbing water would not improve filtration efficiency. For example, for a 0.05 ml ball-shaped drop of water, the diameter thereof is about 0.457 cm. Therefore, to receive the water, the lower film needs to have holes with a diameter not exceeding 0.457 cm.

Figure 4:
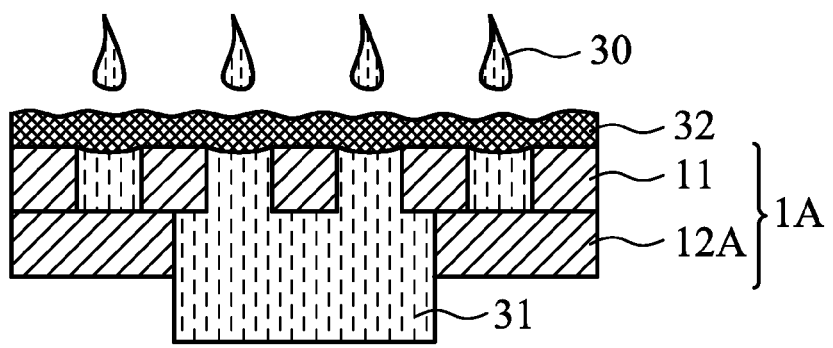
FIGS. 4-5 are cross-sections views of the filter structure during the filtration process.
Figure 5:
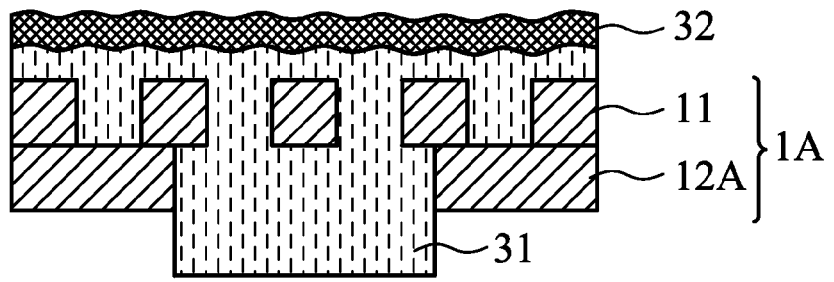

The advantage of the embodiments can be illustrated with FIGS. 4-5, which are cross-section views of the filter structure 1A during the filtration process. Referring to FIG. 4, after the mixed solution 30 flows down onto the top surface of the porous filter film 11, the residue 32 in the mixed solution 30 is intercepted by the porous filter film 11 having the holes smaller than the residue 32, and the liquid 31 keeps flowing down through the holes of the porous filter film 11. As the liquid 31 flows to the bottom surfaces of the holes of the porous filter film 11 that are contacted with the porous film capable of absorbing water 12A, the liquid 31 is directly received by the porous film capable of absorbing water 12A due to the capillary attraction of the porous film capable of absorbing water 12A. As the holes of the porous filter film 11 are connected with the holes of the porous film capable of absorbing water 12A, the liquid 31, flowing into the holes of the porous filter film 11, keeps on flowing down into the holes of the porous film capable of absorbing water 12A. Since the holes of the porous film capable of absorbing water 12A are bigger than that of the porous filter film 11, the liquid 31 at the bottom surface of the holes of the porous film capable of absorbing water 12A has a small retarding surface tension force. Therefore, the liquid can keep flowing down smoothly.

Accordingly, the filter structure of the embodiments has excellent venting efficiency by using the film capable of absorbing water 12A to provide the water-attraction force to increase the flow speed of the filtrated solution. Accordingly, required power is dramatically decreased since the pump that is used in the convention filtration method to increase the flow speed is not needed.

Referring to FIG. 5, after the film capable of absorbing water 12A is full of the liquid 31 (or water, which will not be repeatedly described here), the liquid can be drained out by compressing the film capable of absorbing water 12A. During the compression process, most of the liquid 31 is drained down along the larger holes of the film capable of absorbing water 12A, and a small amount of the liquid 31 flows upward along the smaller holes of the porous filter film 11. The residue 32 on the porous filter film 11 is pushed by the upwardly flowing liquid 31; thereby rinsing the filter structure. It should be noted that the advantage of the embodiments is illustrated by the above-mentioned condition, and some conditions, such as when the liquid may be drained out from the sidewall or bottom surface of the porous film capable of absorbing water 12A during the compression process, are not illustrated in detail. After removing the liquid in the porous film capable of absorbing water 12A and removing the compressing force, the compressed porous film capable of absorbing water 12A springs back to its original shape and recovers the ability of absorbing water 12A. The residue 32 accumulated on the porous filter film 11 can be pushed again and again during repeated compression and non-compression. Therefore, the blocking problem described previously can be improved, and the operating lifespan of the filter structure can be increased.

Those skilled in the art should know the advantages of using the filter structure 1B (FIG. 2) and 1C (FIG. 3) while understanding the descriptions associated with FIGS. 4-5. Taking the filter structure 1C of FIG. 3 as one example, after the mixed solution flows down onto the top surface of the porous filter film 11, the residue 32 in the mixed solution is intercepted by the porous filter film 11, and the liquid keeps flowing down through the holes of the porous filter film 11. Since the bottoms of the holes of the porous filter film 11 directly contact with the film capable of absorbing water 13, the liquid in the holes is directly received by the film capable of absorbing water 13.

After the film capable of absorbing water 13 is full of the liquid (or water, which will not be repeatedly described here), the liquid can be drained out by compressing the film capable of absorbing water 13. During the compression process, a small amount of the liquid flows upward along the smaller holes of the porous filter film 11 so as to rinse the residue 32 on the porous filter film 11, and most of the liquid is drained down along the larger holes of the supporting film 14. It should be noted that the advantage of the embodiments is illustrated by the above-mentioned condition, and some conditions, such as when the liquid may be drained out from the sidewall of the film capable of absorbing water 13 during the compression process, are not illustrated in detail. After removing the liquid in the film capable of absorbing water 13 and removing the compressing force, the compressed film capable of absorbing water 13 springs back to its original shape and recovers the ability of absorbing water 13.

The filter structure of the embodiments has excellent venting efficiency without an additional force. Thus, power consumption is very low. In addition, the residue blocking process on the filter film can be loose so that it may be removed by repeated compression and non-compression during the filtration process. Therefore, the blocking problem described previously can be improved, and the operating lifespan of the filter structure is increased.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example

The filter structure is a two-layer filter structure, wherein the upper film is a PVA foam filter film having 40 μm diameter holes and the lower film is a PVA foam film capable of absorbing water having 80-120 μm diameter holes.

Figure 6:
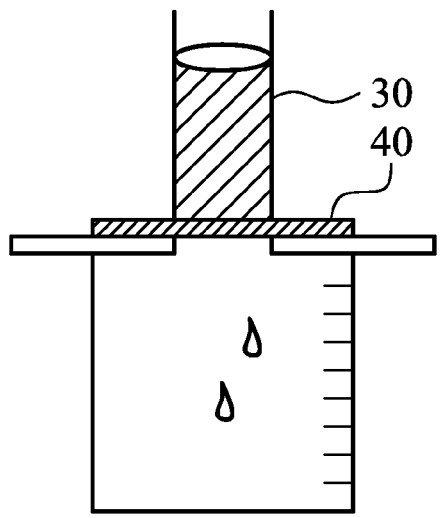
FIG. 6 shows the apparatus for the filtration experiment.
Figure 7:
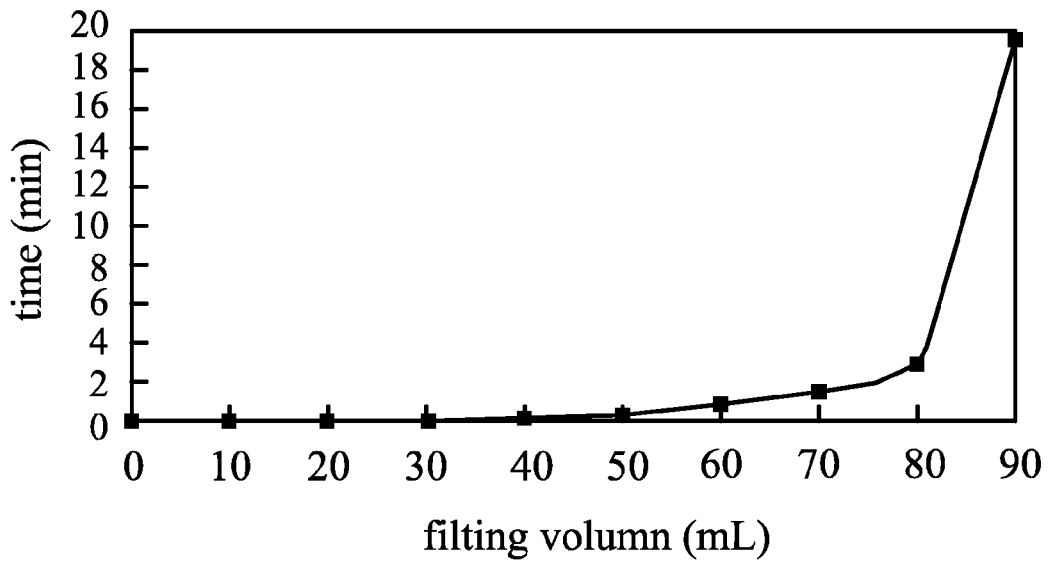
FIG. 7 shows the experiment result of the Example of the embodiments.

FIG. 6 shows the apparatus for the filtration experiment. The filter structure 40 is disposed at the bottom opening of the metering barrel, and the sea solution comprising chlorella of concentration of 400 mg/L is put in the metering barrel. The time spent for the solution passing through the filter structure is shown in FIG. 7.

Comparative Example

The filter structure only uses a single PVA foam filter film having 40 μm diameter holes, which are similar to that in the Example. However, no film capable of absorbing water having larger holes under the filter film is provided. The filtration experiment of the single-layer filter structure is performed using an apparatus similar with that in Example. The experiment result is shown in FIG. 8.

Experimental Result

Figure 8:
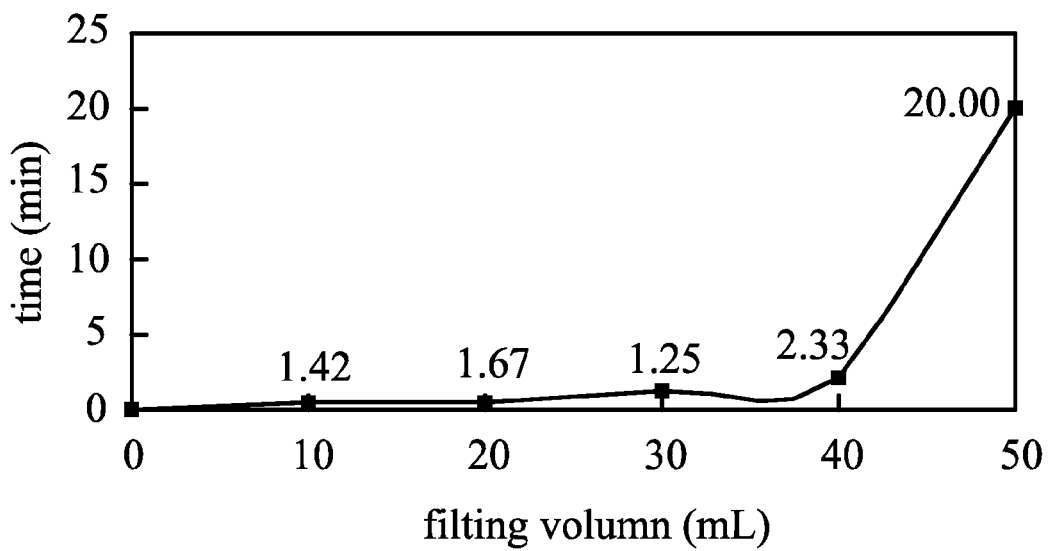
FIG. 8 shows the experiment result of the Comparative Example.

FIG. 7 and FIG. 8 are experiment results of the Example and Comparative Example, respectively. The vertical axis represents the filtering time (min), and the horizontal axis represents the solution volume (ml) passing through the filter structure. From the results shown in FIG. 7 and FIG. 8, it is observed that the filtering speed of the filter structure of the Example is faster than that of the Comparative Example. Accordingly, it is confirmed that the filter structure having the film capable of absorbing water in the embodiments has excellent filtration efficiency.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:
1. A method for filtrating, comprising:
   providing a filter structure for filtering a liquid containing solid particles having a diameter between 0.5 μm to 10 μm, the filter structure comprising:
   a first porous film having a plurality of first holes;
   a second porous film on the first porous film and having a plurality of second holes, wherein the second holes are smaller than the first holes; and
   a foam film capable of absorbing water disposed between the first porous film and the second porous film;

wherein the diameters of the second holes are smaller than the diameters of solid particles in the liquid; and wherein the diameters of the first holes do not exceed 0.457 cm;

drifting down a mixed solution onto a top surface of the second porous film of the filter structure to intercept residue larger than the second holes in the mixed solution, wherein a liquid in the mixed solution passes through the second holes and continues to flow downward;

after the first porous film and the film capable of absorbing water absorbs the liquid, compressing the first porous film and the film capable of absorbing water by a compressing force to drain out the liquid and rinse the second porous film when the liquid flows back to the second porous film due to the compression to remove the residue blocking the second holes; and removing the compressing force so that the compressed first porous film and the compressed film capable of absorbing water springs back to an original shape.

2. The method as claimed in claim 1, wherein the diameters of the first holes are selected such that the first porous film is capable of absorbing water.

3. The method as claimed in claim 1, wherein the first porous film comprises a polymer, non-woven fiber, or synthetic fiber.

4. The method as claimed in claim 3, wherein the first porous film comprises a polyvinyl alcohol (PVA), polyurethane, polyacrylic acid, polyacrylamide, polyethylene or polystyrene.

5. The method as claimed in claim 1, wherein the second porous film comprises a polymer, porous cellulose or ceramics.

6. The method structure as claimed in claim 1, wherein the second porous film comprises a polyvinyl alcohol (PVA), polyethersulfone, cellulose triacetate, polypropylene fiber or polyvinyl chloride.

7. The method as claimed in claim 1, wherein the first holes of the first porous film gradually become larger from the top to the bottom of the first porous film.

8. The method as claimed in claim 7, wherein the first porous film is formed by stacking a plurality of porous films capable of absorbing water of different-sized holes.

* * * * *